No. 729,685. PATENTED JUNE 2, 1903.
S. F. SHORT.
POWER WRENCH.
APPLICATION FILED OCT. 6, 1902.
NO MODEL.

Witnesses:
O. H. Ellett, Jr.
H. W. Leach.

Inventor:
Samuel F. Short,
By ........ Barton
Attorney.

No. 729,685. Patented June 2, 1903.

UNITED STATES PATENT OFFICE.

SAMUEL F. SHORT, OF NEW YORK, N. Y., ASSIGNOR TO WESTERN ELECTRIC COMPANY, OF CHICAGO, ILLINOIS, A CORPORATION OF ILLINOIS.

POWER-WRENCH.

SPECIFICATION forming part of Letters Patent No. 729,685, dated June 2, 1903.

Application filed October 6, 1902. Serial No. 126,052. (No model.)

*To all whom it may concern:*

Be it known that I, SAMUEL F. SHORT, a citizen of the United States, residing at New York, in the county of New York and State of New York, have invented a certain new and useful Improvement in Power-Wrenches, of which the following is a full, clear, concise, and exact description.

My invention relates to a power-wrench for quickly assembling small nuts upon the shanks of screws. Work of this character has heretofore been done by hand, and I have invented a machine by which the manual labor required is very greatly reduced.

I will describe my invention by reference to the accompanying drawings, wherein—

Figure 1:
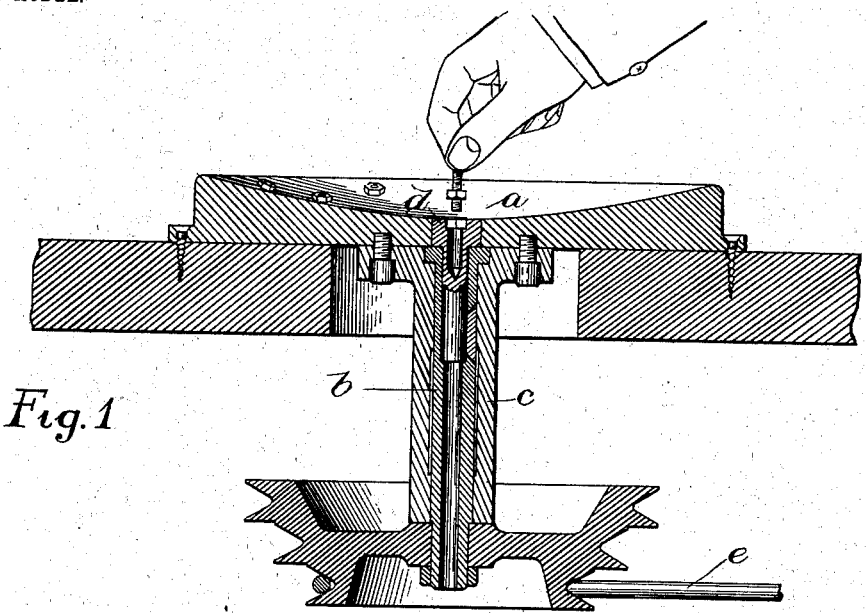
Figure 2:
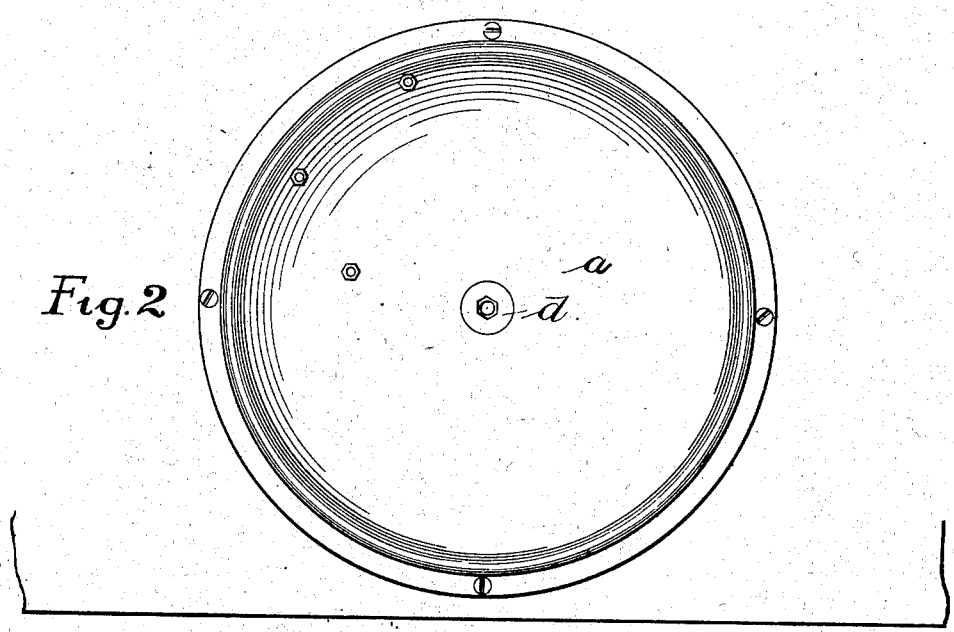

Figure 1 is a vertical sectional view of my improved power-wrench, and Fig. 2 is a plan view thereof.

The same parts are designated by the same letters of reference in both figures.

A bed-plate $a$, preferably of circular form and hollowed at the top, as shown, is secured horizontally upon a suitable table. A vertical spindle $b$ is mounted to rotate in a suitable bearing $c$ below the center of the bed-plate, and a wrench-spindle or chuck $d$ is carried at the upper end thereof, the face of the wrench-spindle having a nut-shaped recess or wrench-socket formed therein, the mouth of said socket being substantially flush with the surface of the bed-plate. The spindle $b$ may be driven by any suitable means, such as the belt $e$.

The operation of the device is as follows: The operator sprinkles a number of nuts on the bed-plate and with the forefinger of the left hand slides one of them down into the rotating wrench-socket. Then he inserts the shank of the screw (which he is holding in his right hand) into the eye of the nut, and the nut is rapidly and automatically screwed on. When it is well on the shank of the screw, the operator simply pulls out the assembled screw and nut, tosses them into a box, slides another nut into the socket, and repeats the operation.

I claim—

The combination with a horizontal bed-plate adapted to receive loose nuts, of a vertical rotating spindle having an open nut-shaped recess or wrench-socket in the upper end, the mouth of said socket being flush with the surface of the bed-plate, whereby the nuts may be slid from the bed-plate into the wrench-socket, the nut held by said socket being automatically screwed upon a suitably-threaded shank which may be presented at the eye thereof.

In witness whereof I hereunto subscribe my name this 17th day of March, A. D. 1902.

SAMUEL F. SHORT.

Witnesses:
 HENRY F. WHITE,
 F. A. HOPTON.